United States Patent
Blake et al.

(10) Patent No.: US 6,210,607 B1
(45) Date of Patent: Apr. 3, 2001

(54) ELECTRICALLY CONDUCTIVE MATERIALS

(75) Inventors: Arthur Edward Blake, Palo Alto, CA (US); Michael Peter Allenden, Swindon (GB)

(73) Assignee: Raychem Limited, Swindon (GB)

( * ) Notice: Subject to any disclaimer, the term of this patent is extended or adjusted under 35 U.S.C. 154(b) by 0 days.

(21) Appl. No.: 06/160,980

(22) Filed: Jun. 19, 1980

Related U.S. Application Data

(63) Continuation of application No. 05/899,658, filed on Apr. 24, 1978, now abandoned.

(51) Int. Cl.$^7$ .............................. H01B 1/24; H02G 15/02; H05K 5/00
(52) U.S. Cl. ..................... 252/511; 174/268; 174/74 R; 428/35.7
(58) Field of Search ............................ 252/511; 174/68.1, 174/261, 268, 74 R, 256; 338/214; 428/35.7

(56) References Cited

U.S. PATENT DOCUMENTS

| | | | |
|---|---|---|---|
| 4,207,364 | * | 6/1980 | Nyberg ............................. 174/73 R |
| 4,277,673 | * | 7/1981 | Kelly ..................................... 252/511 |

FOREIGN PATENT DOCUMENTS

| | | |
|---|---|---|
| 828233 | 1/1960 | (GB) . |
| 828233 | 2/1960 | (GB) . |
| 935625 | 9/1963 | (GB) . |
| 973834 | 10/1964 | (GB) . |
| 996390 | 6/1965 | (GB) . |
| 1296855 | 11/1972 | (GB) . |
| 1352107 | 5/1974 | (GB) . |
| 1384016 | 2/1975 | (GB) . |
| 1449539 | 9/1976 | (GB) . |
| 1455513 | 11/1976 | (GB) . |

OTHER PUBLICATIONS

Humphreys, "Blends of Carbon Blacks: Technical and Economic Aspects" *Proceedings, I.R.I.* 2 (1), 22–32 No Pub. Date.

Norman R H, *Conductive Rubbers and Plastics*, Elsevier Publishing Company Limited New York (1970), p 30 97, Sci Lib TS 1892 N6 No Pub Date.

Berezina et al, "Conductive Rubbers in Cable Production," *Soviet–Rubber Technology*, 21 (9) 20–24–No Pub. Date.

Journal of Applied Polymer Science, vol. 22 (1978) pp. 1163–1165 (Narkis et al).

Polymer Engineering and Science, Jun. 1978, vol. 18, pp. 649–653 (Narkis et al).

* cited by examiner

*Primary Examiner*—Mark Kopec

(57) ABSTRACT

A conductive material is provided which comprises a polymeric matrix having dispersed therein a conductive filler system comprising a minor proportion by weight of a relatively more conductive filler, and a major proportion by weight of a relatively less conductive filler. Preferred conductive materials may be used to provide stress relief for electrical apparatus and may be rendered heat recoverable.

19 Claims, 1 Drawing Sheet

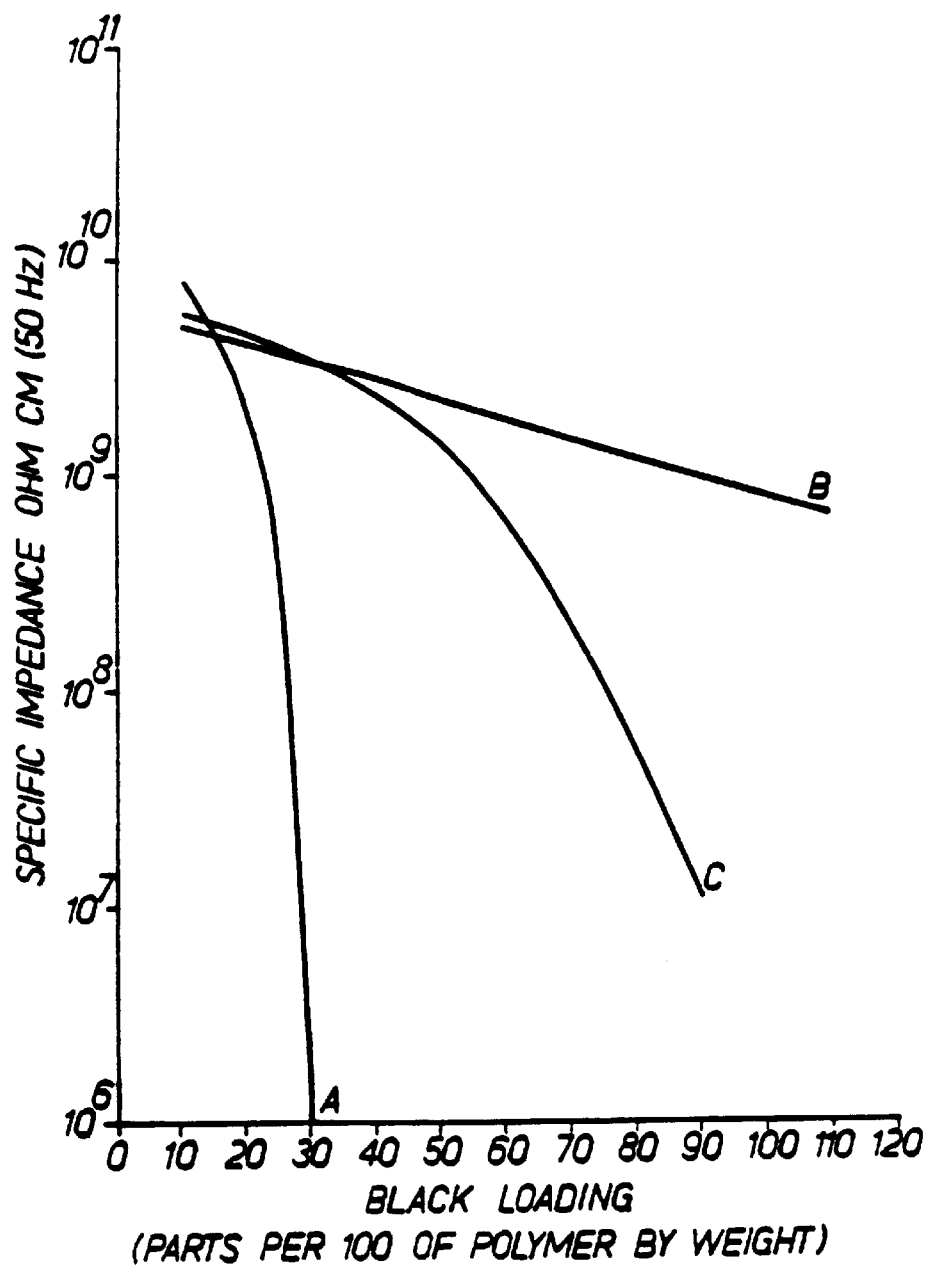

ELECTRICALLY CONDUCTIVE MATERIALS

This is a continuation of application Ser. No. 899,658, filed Apr. 24, 1978 now abandoned.

This invention relates to electrically conductive materials and more particularly to conductive materials comprising a polymeric matrix and a conductive filler.

It is known, in order to suppress the occurrence of electrical discharges in areas of high electrical stress, for example at the shield end of high voltage cable termination, to provide a stress relieving material which extends around the insulation for some distance from the end of the shield. A variety of stress relieving materials have been proposed for this purpose, for example, polymeric materials containing carbon black as the conductive filler. Exemplary of these prior art materials is that described in British Patent No. 1,394,272 in which there is disclosed an elastomeric dielectric composition having a permittivity of at least 20 and comprising an elastomeric component, from 15 to 130 parts by weight, per 100 parts of the elastomeric component, of carbon black, and from 0.4 to 25 parts by weight, per 100 parts by weight of the elastomeric component, of one or more plasticising and/or peptizing agents.

However, it has been found in practice that the resistivity and impedance of such materials is very sensitive to small variations in the loading of the conductive filler, thus making it very difficult to obtain consistent electrical properties in manufacture. This problem, which arises for conductive materials generally, is especially acute with those whose electrical properties make them of interest as stress relieving materials in high voltage applications. An increase in the loading of the conductive filler produces larger values of both the permittivity and the loss tangent.

Whilst larger values of the former are desirable. When the impedance opposite is true for the loss tangent. When the impedance is sensitive to changes in loading it then becomes difficult to obtain the desired values of permittivity and loss tangent simultaneously, and consistently. An increase in the resistive nature of the material (associated with the loss tangent) due to the above may result in an unusable product.

Suprisingly, it has now been found that the susceptibility of a conductive material to small variations in loading of the conductive filler may be markedly reduced by the use of more than one such conductive filler in the material.

According to the present invention there is provided a conductive material which comprises a polymeric matrix having dispersed therein a conductive filler system comprising a minor proportion of a relatively more conductive filler as hereinafter defined and a major proportion of a relatively less conductive filler as hereinafter defined.

The invention also provides a composition suitable for processing, for example by moulding or extrusion, into a conductive material according to the invention, and an electrical component comprising such a conductive material.

The invention will now be more particularly described with reference to conductive materials having stress relieving properties, but it is to be understood that the invention is not limited thereto and may have application to conductive materials generally.

In one aspect, therefore, the present invention provides a material having stress relieving properties, which comprises a polymeric matrix having dispersed therein a filler system comprising a minor proportion of a relatively more conductive filler and a major proportion of a relatively less conductive filler as hereinafter defined.

For use as a stress relieving material in high voltage application, typically from 5 kV to 69 kV or even higher, for example about 20 kV, the composition is required to exhibit a high permittivity, usually in excess of 20. This corresponds to a specific impedance close to $10^9$ ohm cm. In the materials to be described the specific impedance is desirably less than $10^9$ ohm cm, and most preferably between $10^7$ and $10^9$ ohm cm, all values at a frequency of 50 Hz. Preferably the polymeric matrix and the filler system are so chosen that, if a curve is constructed of filler loading, in parts by weight per 100 parts by weight of polymeric matrix, against impedance of the conductive material, the rate of change of $\log_{10}$ (impedance) with loading at an impedance value of $10^8$ ohm cm lies in the range of from 0.1 to 0.017, preferably from 0.07 to 0.025.

Polymeric materials suitable for use as the polymeric matrix may include resins comprising, for example, polyolefins and olefin copolymers such as polyethylene, polypropylene, ethylene/propylene copolymers, and polybutenes; substituted polyolefins, particularly halogen-substituted polyolefins such as polyvinyl chloride, polyvinylidene chloride, polyvinylidene fluoride, Teflon 100 (a polytetrafluoroethylene manufactured by Du Pont), Teflon FEP (a copolymer of tetrafluoroethylene and hexafluoropropylene manufactured by Du Pont) Teflon PFA (a copolymer of tetrafluoroethylene and perfluoroalkoxy moieties manufactured by Du Pont), Tefzel (a terpolymer of ethylene, tetrafluoroethylene and a fluorinated monomer manufactured by Du Pont), and Halar (a copolymer of ethylene and chlorotrifluoroethylene manufactured by Allied Chemicals); polyesters, particularly segmented copolyester polymers such as Bytrel (a segmented polyether ester copolymer derived from terephthalic acid, polytetramethylene ether glycol and 1,4-butanediol manufactured by Du Pont); and polyurethane.

Other suitable polymeric materials for use as the polymeric matrix include elastomers comprising, for example, copolymers of dienes with olefinically unsaturated monomers such as ethylene/propylene/non-conjugated diene terpolymers, styrene/butadiene polymers, butyl rubbers and copolymers of dienes with unsaturated polar monomers such as acrylonitrile, methyl methacrylate, ethyl acrylate, vinyl pyridine and methyl vinyl ketone; halogen-containing elastomers such as chloroprene polymers and copolymers, for example neoprene, chlorinated polyethylene, chlorosulphonated polyethylene, and Viton (a copolymer of vinylidene fluoride and hexafluoropropylene manufactured by Du Pont); copolymers of olefins with olefinically unsaturated esters such as elastomeric ethylene/vinyl acetate polymers, ethylene/acrylic acid ester copolymers such as ethylene/ ethyl acrylate and methacrylate copolymers, particularly ethylene/acrylic rubbers such as Vamac (a terpolymer of ethylene, methyl acrylate and a cure-site monomer manufactured by Du Pont), and acrylic rubbers such as polyethyl acrylate, polybutyl acrylate, butyl acrylate/ethyl acrylate copolymers, and butyl acrylate/glycidyl methacrylate copolymers; silicone elastomers such as polydiorganosiloxanes, copolymers, block copolymers and terpolymers of monomethylsiloxanes, dimethylsiloxane, methylvinylsiloxane and methylphenylsiloxane, fluorosilicones for examples these derived from 3,3,3-trifluoropropyl siloxane and carborane siloxanes, elastomeric polyurethanes; and polyethers such as epichlorohydrin rubbers.

Blends of the above mentioned elastomers and thermoplastic resins may also advantageously be used. Particularly good results have been obtained using polyolefins, olefin copolymers and halogen-substituted olefin copolymers and these are the preferred polymeric materials for use in the present invention.

The relatively more conductive fillers may be chosen from among those particulate fillers currently used in the production of conductive materials. In FIG. 1, curve A, there is shown a plot of impedance against filler loading, in parts by weight per 100 parts by weight of base material for a typical conductive filler of this type.

It will be observed that as the loading is increased the curve is first shallow and then falls steeply in the range of specific impedance values $10^9$ to $10^6$. Within a range of impedance values $10^9$ to $10^7$ which is the region of interest in the production of stress relieving materials, the impedance falls by a factor of two orders of magnitude with a change in filler loading of 10% by weight. It can thus be seen that a relatively small change in filler loading, such as may be occasioned by normal processing variations has a dramatic effect upon the impedance of the resultant material. In this specification the term relatively more conductive filler is defined as referring to a filler which exhibits a curve of impedance versus loading generally of the type described above and reaches a specific impedance of less than $5 \times 10^6$ ohm cm and preferably less than $10^6$ ohm cm at a loading of 60 parts by weight, per 100 parts by weight of polymer, in polyethylene of density 0.916 gm $cm^{-3}$ and melt flow index of 2, measured at 50 Hz with a field strength of 4 kV/cm.

An especially preferred conductive filler for use in the materials of the present invention is conductive carbon black. Suitable carbon blacks may be chosen from among those currently commercially available, for example, types HAF, SRP, EPC, FEF, and ECF. Preferably, the conductive carbon black has an average particle size of from 10 to 100 millimicrons, most preferably from 20 to 60 millimicrons, and an average specific surface area greater than 30 $m^2$/gm, most preferably greater than 100 $m^2$/gm as measured by the method of ASTM D3037-76. Examples of suitable materials include those manufactured by Cabot under the trade names Vulcan XC72, Vulcan P, and Vulcan 3; by Columbian under the trade names Statex 160, Statex 125 and Conductex 950; by AKZO Chemic under the trade name Kotjen Black EC; and by Degussa under the trade names Corax L and Corax P.

The relatively less conductive filler may be chosen from amongst that group of fillers which are not normally preferred for use in conductive materials, but which nevertheless exhibit an appreciable conductivity. In FIG. 1, curve B, there is shown a plot of the specific impedance against filler loading, in parts by weight per 100 parts by weight of polymer, for a typical conductive filler of this type. It will be observed that curve B has a relatively shallow slope with no steep sections, showing unfortunately for fillers of this type, that very high loadings are required to obtain an impedance within the desired region. Typically this can be a loading in excess of 100 parts by weight of polymer and in some cases can never reach the desired impedance region at loadings below the maximum practical limit. It will be seen that, in contrast to curve A, the specific impedance decrease by less than an order of magnitude over a change in filler loading of 100% weight.

Associated with this type of filler at high loadings is a greater variability in the d.c. resistivity and, more obviously, the detrimental effects on physical properties and the processability of the material.

By the term relatively less conductive filler in this specification is meant a filler which exhibits an impedance versus loading curve generally of the type described above and having a specific impedance greater than $10^9$9 ohm cm and preferably less than $10^{10}$ ohm cm at a loading of 60 parts by weight, per 100 parts by weight of polymer, in polyethylene of density 0.916 gm $cm^{-3}$ and melt flow index 2, measured at 50 Hz with a field strength of 4 kV/cm.

Particularly preferred for use as the relatively less conductive filler in the present invention are the so-called low structure carbon blacks, such as, for example, those types referred to as Thermal blacks. Preferably the relatively less conductive filler has an average particle size of at least 30 millimicrons, most preferably at least 150 millimicrons, and an average specific surface area of less than 20 $m^2$/gm, most preferably less than 10 $m^2$/gm as measured by the method of ASTM D3037-76. Examples of suitable materials include those manufactured by Vanderbilt under the trade names Thermax and P-33; by Sevalco under the trade name Sevacarb MT; and by Columbian under the trade name Statex MT.

Although it is preferred to use a mixture of two carbon blacks as the filler system, one or both of those may be replaced either wholly or partly by other suitable fillers having similar properties. It is of course possible to use mixtures comprising three or more conductive fillers having different properties provided that at least one relatively more conductive filler and one relatively less conductive filler are present. Other suitable conductive fillers may include, for example, finely divided particles of a metal such as zinc, aluminium, chromium, copper, bronze, brass, iron, lead, silver, cadmium or nickel; silicon carbide or the various conductive fillers disclosed in British Patent 1,470,501. Other reinforcing or pigmenting fillers may also be used, together with antioxidants and other additives.

As previously stated the conductive material preferably has a specific impedance less than $10^9$ ohm cm, and in order to obtain this figure it is usually necessary to incorporate into the polymeric matrix at least 10% by weight of the relatively more conductive filler based on the weight of the polymeric matrix. Preferably the relatively more conductive filler is present in an amount of from 10 to 40% by weight and most preferably from 10 to 25% by weight. Similarly it is usually found necessary to add the relatively less conductive filler in an amount of at least 40% by weight. The maximum amount of relatively less conductive filler which can be added is determined by the processability of the material and the required physical properties. Preferably the relatively less conductive filler is added in an amount of from 50 to 80% by weight based on the weight of the polymeric matrix.

In the preferred conductive materials, the ratio of the weights of relatively less conductive filler to relatively more conductive filler lies within the range of from 2:1 to 8:1, and most preferably from 3:1 to 6:1.

The conductive materials and compositions of the present invention find particular application where it is necessary to control high electric stress and they have the additional advantage that by the appropriate choice of polymeric material they may be formed into heat recoverable articles. A heat recoverable article is one which is in a dimensionally unstable condition and is capable of altering its physical form upon the application of heat alone to assume a dimensionally heat stable condition. Such an article may, for example, be produced by deforming the article under heat and pressure from an original heat-stable dimensional form into a different heat unstable form. While this article is maintained below a certain temperature it will retain its unstable form, but when it is heated to above this temperature, termed the recovery temperature, it will recover towards its original form. The present invention accordingly also provides an article, for example a tube, which can be rendered heat recoverable, comprising a conductive material as described herein, and also a heat recoverable article formed therefrom.

The heat recoverable article may, for example, be produced by crosslinking the polymeric material, either by irradiation or by the use of a chemical crosslinking agent, for example a peroxide, deforming the article by the desired amount at or above the critical temperature and then cooling the article whilst maintaining it in the deformed state. Suitable methods and materials for the manufacture of heat recoverable articles are described in U.S. Pat. Nos. 2,027, 962 3,086,242 and 3,975,372, the disclosures of which are incorporated herein by reference.

The heat recoverable articles of the invention may be recovered onto, for example cable terminations to produce stress relieving covering thereon as described for example in Penneck & Clabburn Proc. 10th Electrical Insulation Conference 20–27 1971 pages 292–297.

The materials of this invention need not necessarily be heat recoverable, however, and for example they may also be used to provide stress relief push-on terminations for high voltage cables. It will be appreciated that the materials of the invention have application to electrical parts other than cable terminations where it is desirable to have stress relieving coverings, for example to lightning arrestors, switch components or ends of stator bars, and cable splices.

The invention may also be useful in the production of conductive materials for use as heaters, and particularly of heating tapes, water bed heaters and such like.

The invention is illustrated by the following examples:

EXAMPLE 1

This example describes materials having stress relieving properties according to the invention, and a comparison of their properites with similar materials containing only relatively more conductive or only relatively less conductive carbon blacks.

The following components were compounded in a Bridge Banbury internal mixer with a charge weight of 1.2 Kg.

| | |
|---|---|
| CPE 3614 | A chlorinated polyethylene manufactured by Dow Corning |
| DYNH 3 | A low density polyethylene manufactured by BXL Bakelite |
| VULCAN P | A furnace black manufactured by Cabot |
| THERMAX MT | A thermal black manufactured by Vanderbilt |
| Other Components | Comprising conventional antioxidants and stabilizers |

Vulcan P is a relatively more conductive carbon black giving a specific impedance of below $10^6$ ohm cm at a loading of 60 parts by weight per 100 parts by weight of polymer in polyethylene of density 0.916 gm cm$^{-3}$ and melt flow index 2. Thermax MT is a relatively less conductive carbon black having a specific impedance greater than $10^9$ $\Omega$cm at a loading of 60 parts by weight, per 100 parts by weight of polymer in polyethylene of density 0.916 gm cm$^{-3}$ and melt flow index 2.

The tables below list the relative proportions of the components in the mixed compositions (all parts are by weight).

A) Components containing only relatively more conductive carbon black

| | | | | | | | |
|---|---|---|---|---|---|---|---|
| CPE 3614 | 62.5 | | | | | | |
| DYNH 3 | 37.5 | | | | | | |
| VULCAN P | 10 | 20 | 30 | 40 | 50 | 60 | |
| THERMAX MT | 0 | | | | | | |

B) Compositions containing only relatively less conductive carbon black

| | | | | | | | | | | | | |
|---|---|---|---|---|---|---|---|---|---|---|---|---|
| CPE 3614 | 62.5 | | | | | | | | | | | |
| DYNH 3 | 37.5 | | | | | | | | | | | |
| VULCAN P | 0 | | | | | | | | | | | |
| THERMAX MT | 10 | 20 | 30 | 40 | 50 | 60 | 70 | 80 | 90 | 100 | 110 | 120 |

C) Compositions containing a mixture of two carbon blacks at a ratio of 4:1

| | | | | | | | | | |
|---|---|---|---|---|---|---|---|---|---|
| CPE 3614 | 62.5 | | | | | | | | |
| DYNH 3 | 37.5 | | | | | | | | |
| VULCAN P | 2 | 4 | 6 | 8 | 10 | 12 | 14 | 16 | 18 |
| THERMAX MT | 8 | 16 | 24 | 32 | 40 | 48 | 56 | 64 | 72 |

Plaque samples 2 mm thick were pressed at 150° C. and cooled to room temperature to provide samples for testing. Circular electrodes were painted on both sides of each sample which was placed between brass electrodes conforming to B.S. 2782 (201). The specific impedance was obtained from a measurement of both voltage and current at 50 Hz and the known sample dimensions, using a field strength of a 4 kV/cm.

The results are illustrated graphically in FIG. 1 which is a plot of the impedance versus loading for the three sets of compositions. It can be seen that the slope of curve C, representing the mixture of carbon blacks, is far less steep than curve A, representing the conductive carbon black alone; thus showing that materials containing the mixture of carbon blacks are far less sensitive to small changes in the carbon black loading. In addition curve C passes through the preferred impedance range at significantly lower loadings than curve B. The rate of change of $\log_{10}$ (impedance) with loading for curve C at an impedance value of $10^8$ ohm cm is 0.05.

EXAMPLE 2

This Example describes a material according to the invention suitable for manufacture into a heat-shrinkable article.

The following components were mixed together in an internal mixer, all parts by weight.

| | |
|---|---|
| CPE 3614 | 62.5 |
| DYNH 3 | 37.5 |
| VULCAN P | 15.625 |
| THERMAX MT | 62.5 |
| AGERITE RESIN D | 2.5 |
| DI BASIC LEAD PHTHALATE | 4.375 |
| TETRA BASIC LEAD FUMARATE | 1.875 |
| TRIALLYL CYANURATE | 1.875 |

The resulting material was extruded into a tube with a wall thickness of 1.5 mm and an internal diameter of 14 mm. Following electron beam irradiation to a dose of 12 Mrad the sleeve was expanded to a diameter (internal) of 32 mm by a process as described in British Patent 990,235.

The electrical properties of the stress relief sleeve before and after recovery were measured with results as follows:

| SLEEVE DIAMETER I.D. | SPECIFIC IMPEDANCE 50 Hz | D.C. RESISTIVITY |
|---|---|---|
| mm | ohm cm | ohm cm |
| 32 | $5.4 \times 10^8$ | $3 \times 10^{11}$ |
| 14 | $5.0 \times 10^8$ | $0.5 \times 10^{11}$ |

For the purpose of testing the stress relieving properties, a 2 metre length of power cable was terminated at both ends with samples of the tubing. The cable was a 24 kV crosslinked plastic single core cable with 150 mm² cross-sectional area A1 conductor. The samples 200 mm in length were heat recovered onto the cable with 3 cm overlap of the graphite shield.

The discharge levels in the cable and end terminations were measured using an ERA Mark 3 discharge detector, over an applied voltage range of 0–50 kV.

The result at twice the rated working voltage of the cable was:

| APPLIED VOLTAGE kV | DISCHARGE MAGNITUDE pc |
|---|---|
| 28 | 0.5 |

The cable specimen was then subjected to a load cycling test consisting of 126 cycles of 5 hours on load and 3 off with an applied voltage of 29 kV, the conductor temperature reaching 95° C.

The result was then:

| APPLIED VOLTAGE kV | DISCHARGE MAGNITUDE pc |
|---|---|
| 28 | 1.5 |

The impulse strengths of the terminated samples were tested and found to be >125 kV (ten shots +ve and −ve).

These results show that the material has excellent stress grading properties and that these are maintained during extended ageing.

EXAMPLE 3

The procedure of Example 1 was repeated using compositions according to the invention but having different polymer matrices. The compositions and specific impedances are as follows:

| | | | |
|---|---|---|---|
| a) | Royalene 611 | 62.5 | Specific Impedance |
| | DYNH 3 | 37.5 | $5.6 \times 10^8$ ohm cm |
| | Vulcan P | 14 | |
| | Thermax MT | 56 | |
| | Agerite Resin D | 2.5 | |
| | Di basic lead phthalate | 4.375 | |
| | Tetra basic lead fumerate | 1.875 | |
| | Triallyl Cyanurate | 1.875 | |

-continued

| | | | |
|---|---|---|---|
| b) | CPE 3514 | 100 | Specific Impedance |
| | Vulcan P | 14 | $3.2 \times 10^8$ ohm cm |
| | Thermax MT | 56 | |
| | Agerite Resin D | 2.5 | |
| | Di basic lead phthalate | 4.375 | |
| | Tetra basic lead fumarate | 1.875 | |
| | Triallyl Cyanurate | 1.875 | |
| c) | DPD 6169 | 100 | Specific Impedance |
| | Vulcan P | 14 | $1.6 \times 10^8$ ohm cm |
| | Thermax MT | 56 | |
| | Agerite Resin D | 2.5 | |
| | Di basic lead phthalate | 4.375 | |
| | Tetra basic lead fumarate | 1.875 | |
| | Triallyl Cyanurate | 1.875 | |
| d) | CS 104 | 100 | Specific Impedance |
| | Vulcan P | 10 | $6.8 \times 10^7$ ohm cm. |
| | Thermax MT | 40 | |
| | Agerite Resin D | 2.5 | |
| | Di basic lead phthalate | 4.375 | |
| | Tetra basic lead fumarate | 1.875 | |
| | Triallyl Cyanurate | 1.875 | |

DPD 6169 is an ethylene copolymer manufactured by Union Carbide (melt flow index 6 density 0.931).
Royalene 611 is an ethylene-propylene-non-conjugated diene terpolymer manufacturer by Uniroyal.
CS104 is a silicone elastomer manufactured by ICI

EXAMPLE 4

The procedure of Example 1 was repeated using compositions according to the invention having various ratios of relatively more conductive and relatively less conductive carbon blacks. The compositions and specific impedances are as follows:

| | | | |
|---|---|---|---|
| a) | CPE 3614 | 62.5 | Specific Impedance |
| | DYNH 3 | 37.5 | $3.8 \times 10^7$ ohm cm |
| | Vulcan P | 20 | |
| | Thermax MT | 40 | |
| | Agerite Resin D | 2.5 | |
| | Di basic lead phthalate | 4.375 | |
| | Tetra basic lead fumarate | 1.875 | |
| | Triallyl Cyanurate | 1.875 | |
| b) | CPE 3614 | 62.5 | Specific Impedance |
| | DYNH 3 | 37.5 | $2.2 \times 10^8$ ohm cm |
| | Vulcan P | 16.6 | |
| | Thermax MT | 33.3 | |
| | Agerite Resin D | 2.5 | |
| | Di basic lead phthalate | 4.375 | |
| | Tetra basic lead fumarate | 1.875 | |
| | Triallyl Cyanurate | 1.875 | |
| c) | CPE 3614 | 62.5 | Specific Impedance |
| | DYNH 3 | 37.5 | $7.6 \times 10^8$ ohm cm |
| | Vulcan P | 10 | |
| | Thermax MT | 60 | |
| | Agerite Resin D | 2.5 | |
| | Di basic lead phthalate | 4.375 | |
| | Tetra basic lead fumarate | 1.875 | |
| | Triallyl Cyanurate | 1.875 | |
| d) | CPE 3614 | 62.5 | Specific Impedance |
| | DYNH 3 | 37.5 | $6.3 \times 10^8$ ohm cm |
| | Philips GPF | 16 | |
| | Thermax | 64 | |
| | Agerite Resin D | 2.5 | |
| | Di basic lead phthalate | 4.375 | |
| | Tetra basic lead fumarate | 1.875 | |
| | Triallyl Cyanurate | 1.875 | |
| e) | CPE 3614 | 62.5 | Specific Impedance |
| | DYNH 3 | 37.5 | $3.2 \times 10^7$ ohm cm |
| | Philips GPF | 20 | |
| | Thermax | 80 | |
| | Agerite Resin D | 2.5 | |
| | Di basic lead phthalate | 4.375 | |
| | Tetra basic lead fumarate | 1.875 | |
| | Triallyl Cyanurate | 1.875 | |

We claim:

1. A conductive material suitable for use as a stress relieving material in high voltage applications which comprises a polymeric matrix having dispersed therein a conductive filler system comprising a minor proportion by weight of a relatively more conductive filler and a major proportion by weight of a relatively less conductive filler, the relatively more conductive filler being one that exhibits a loading curve which falls steeply in the range of specific impedance values to $10^9$ to $10^6$ ohm cm and reaches impedance of less than $5 \times 10^6$ ohm cm at a loading of 60 parts by weight per 100 parts by weight of polymer, in polyethylene of specific density of 0.916 gm cm$^{-3}$ and melt flow index 2, measured at 50 Hz with a field strength of 4 kV/cm, and the relatively less conductive filler being one that exhibits a loading curve having a relatively shallow slope with no steep sections and which has a specific impedance greater than $10^9$ ohm cm at a loading of 60 parts by weight per 100 parts by weight of a polymer, in polyethylene of density 0.916$^{-3}$ and melt flow index 2, measured at 50 Hz with a field of strength of 4 kV/cm, the filler system comprising a mixture of two carbon blacks, the materials having a specific impedance of from $10^7$ to $10^9$ ohm cm, at a frequency of 50 Hz and a field strength of 4 kV/cm.

2. A material according to claim 1, in which the polymeric matrix and the filler system are so chosen that, if a curve is constructed of filler loading, in parts by weight per 100 parts by weight of polymeric matrix, against impedance of the conductive material, the rate of change of $\log_{10}$ (impedance) with loading at an impedance value of $10^8$ ohm cm lies in the range of from 0.1 to 0.017.

3. A material according to claim 1, in which the polymeric matrix comprises a polyolefin, an olefin copolymer or a halogen-substituted polyolefin.

4. A material according to claim 1, in which the polymeric matrix comprises a blend of an elastomer and a thermoplastic resin.

5. A material according to claim 1, in which the relatively more conductive filler is one which exhibits a loading curve which falls steeply in the range of specific impedance values of $10^9$ to $10^6$ ohm cm and reaches a specific impedance of less than $10^6$ ohm cm at a loading of 60 parts by weight, per 100 parts by weight of polymer in polyethylene of specific density 0.916 grams cm$^{-3}$ and melt flow index 2, measured at 50 Hz with a field strength of 4 kV/cm.

6. A material according to claim 1, in which the conductive carbon black has an average particle size of from 10 to 100 millimicrons and an average specific surface area greater than 30 m$^2$/gm.

7. A material according to claim 1, in which the relatively less conductive filler is one which exhibits a loading curve having a relatively shallow slope with no steep sections and which has a specific impedance greater than $10^9$ ohm cm and less than $10^{10}$ ohm cm at a loading of 60 parts by weight, per 100 parts by weight of polymer, in polyethylene of density 0.916 gm cm$^{-3}$ and melt flow index 2, measured at 50 Hz with a field strengrth of 4 kV/cm.

8. A material according to claim 1, in which the relatively less conductive filler is a low structure carbon black.

9. A material according to claim 1, in which the relatively less conductive filler has an average particle size of at least 30 millimicrons and an average specific surface area of less than 20 m$^2$/gm.

10. A material according to claim 1, in which the relatively more conductive filler is present in an amount of from 10 to 40% by weight based on the weight of the polymeric matrix.

11. A material according to claim 1 or 10, in which the relatively less conductive filler is present in an amount of from 50 to 80% by weight based on the weight of the polymeric matrix.

12. A material according to claim 1, in which the ratio of the weight of the relatively less conductive filler to the weight of the relatively more conductive filler lies in the range of from 2:1 to 8:1.

13. A heat recoverable article comprising a conductive material according to claim 1.

14. A method of protecting an electrical component against electric stress by recovering thereon a heat recoverable article according to claim 13.

15. A heat recoverable article according to claim 13 that is in the form of a tube.

16. A composition suitable for processing by moulding or extrusion into a conductive material according to claim 1.

17. An electrical component comprising a conductive material according to claim 1.

18. An electrical component protected against electric stress by a conductive material according to claim 1.

19. An electric cable termination or splice having a stress relieving cover comprising a conductive material according to claim 1.

* * * * *